Sept. 4, 1923.

E. J. TOMLINSON

PHONOGRAPH

Filed May 31, 1919

INVENTOR
EDWARD J. TOMLINSON
BY
Albion D. T. Libby
ATTORNEY

Sept. 4, 1923.  E. J. TOMLINSON  1,467,210
PHONOGRAPH
Filed May 31, 1919  6 Sheets-Sheet 2

INVENTOR
EDWARD J. TOMLINSON
BY
Albion D. T. Libby
ATTORNEY

Sept. 4, 1923.

E. J. TOMLINSON

PHONOGRAPH

Filed May 31, 1919

INVENTOR
Edward J. Tomlinson
BY
A. D. T. Libby
ATTORNEY

Sept. 4, 1923.

E. J. TOMLINSON

PHONOGRAPH

Filed May 31, 1919

INVENTOR
EDWARD J. TOMLINSON
BY
Albion D. T. Libby
ATTORNEY

Sept. 4, 1923.

E. J. TOMLINSON

PHONOGRAPH

Filed May 31, 1919

INVENTOR
EDWARD J. TOMLINSON
BY
Albion D. T. Libby
ATTORNEY

Sept. 4, 1923.

E. J. TOMLINSON

PHONOGRAPH

Filed May 31, 1919

INVENTOR
Edward J. Tomlinson
BY
Albion D. Libby
ATTORNEY

Patented Sept. 4, 1923.

1,467,210

UNITED STATES PATENT OFFICE.

EDWARD J. TOMLINSON, OF EAST ORANGE, NEW JERSEY, ASSIGNOR TO SPLITDORF ELECTRICAL COMPANY, OF NEWARK, NEW JERSEY.

PHONOGRAPH.

Application filed May 31, 1919. Serial No. 301,101.

*To all whom it may concern:*

Be it known that I, EDWARD J. TOMLINSON, a citizen of the United States, residing at East Orange, in the county of Essex and State of New Jersey, have invented certain new and useful Improvements in Phonographs, of which the following is a specification.

This invention relates to electrically operated phonographs and as illustrated is particularly adapted for playing a record in the form of a flat disk or plate.

It is the principal object of my invention to provide a phonograph in which the sound record body is carried on a support electrically driven in such a manner as to insure a constant speed and quietness of operation. In certain types of motors now in use more or less noise is produced by them which is a detriment to the production of the best results from the playing of the record.

Another object of my invention is to secure the above results with a motor mechanism that is simple in construction and highly efficient in its operation, consuming a small amount of current. Heretofore it has been customary to use one or more pairs of magnets to act successively on pole pieces attached to the rotating support for the sound record body, but my invention is particularly directed to means for making all of the armature bodies or pole pieces do work simultaneously instead of concentrating this work into a pair of pole pieces.

It is another object of my invention to provide a starting and stopping mechanism for the rotating support, which is very simple and positive in its operation.

Another object of my invention is to provide a phonograph motor consisting of a unitary structure containing substantially all the moving parts which are preferably enclosed within a suitable casing so that the unitary structure may be handled with considerable degree of roughness without injuring the mechanism.

Other and further objects will be apparent to one skilled in the art after a study of the specification and drawings annexed thereto, wherein—

Figure 3 is a bottom view of the device shown in Figure 1.

Figure 4 is a bottom view of one form of a sound record support.

Figure 7 is a schematic arrangement of the wiring diagram of the phonograph motor showing the starting lever in the non-running position.

Figure 8 is a view of the starting lever in running position.

Figure 9 illustrates the position of the governor control lever in one position.

Figure 10 is an enlarged view of a portion of Figure 9 to illustrate the manner in which the governor contact is controlled to regulate the speed.

Figure 11 is a view similar to Figure 10 but with the parts in different position.

Figure 22:
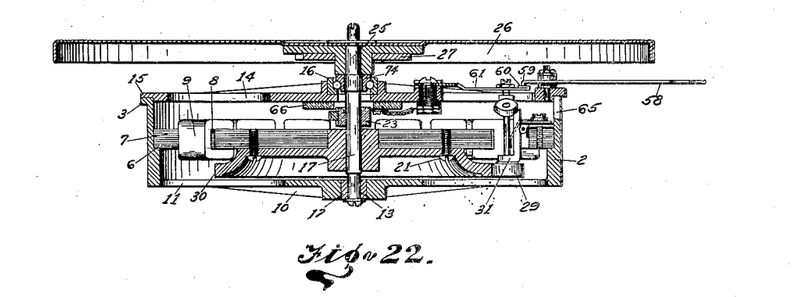
Fig. 22 is a cross-sectional view of the assembled phonograph motor.

Referring now to the details, wherein like numbers refer to corresponding parts in the various views, 1 illustrates the frame to which is fastened the casing 2 of a phonograph motor. The casing 2 has a shoulder 3 to fit the frame 1 and is held to the frame in any suitable manner, such as by screws 4 and washers 5. It will be obvious that other means of supporting the casing 2 to the frame 1 may be employed. The casing 2 has an inner annular flange 6 on which rests a ring 7 of suitable magnetic material having a plurality of pole pieces 8 which project radially inwardly toward the center of the motor. These pole pieces are provided with windings 9 which will be later referred to. The casing 2 is preferably ribbed as at 10 and the bottom part has openings 11 through which the interior mechanism may be inspected and for the further purpose of giving lightness to the motor casing 2 which I prefer to make of some light material such as aluminum. The bottom of the casing 2 has a bushing 12 set therein and the bushing 12 is provided with a central annular hole 13. A top cover plate 14 having a flange 15 is adapted to fit on the top of the casing 2. The top part of the plate 14 is provided with an anti-friction ball race 16. Mounted within the casing 2 is a shaft 17 on which is fastened a circular member 18 to which is fastened as by screws 21, a magnetic member 19 having inductor poles 20 which extend radially outward from the center toward and in close proximity to the poles 8. The lower end 22 of the shaft 17 is adapted to fit the hole 13 in the bottom of the casing 2 but the entire weight of the members 18 and 19 is carried on the bearing race 16 in the top cover plate 14. A cooperating race 74 is fastened to the shaft 17 with anti-friction balls therebetween, all in a well known manner, hence the bushing 12 having the hole 13 therein to receive the end 22 of the shaft 17 merely acts as a guide for this end of the shaft. Carried on the shaft 17 is a cam 23 which is used for the purpose of operating a circuit breaker similar to that shown and described in my copending application, Serial No. 288,386, filed April 7, 1919. The circuit breaker member is mounted on a plate 66 which is carried on the underside of the top cover plate 14 by screws passing through the slots 24. Secured to this plate by screws 68 and insulated therefrom as by a fibre plate 67 is a member bearing a stationary contact 46 with which is adapted to cooperate the contact member 45 pivoted on a stud 72. A bowed spring 73 bearing against one end of the pivoted member and against a fixed stud 71 tends to maintain the contacts in engagement. Threaded holes 69 are provided in the plate 66 so as to permit screws passing through the slots 24 in the plate 14 to hold the same in place. The slots 24 are for the purpose of permitting the rotation of the timer plate 66 so as to enable the pole pieces to be energized when they are at a given angular distance from the poles 8. The circuit breaker is shown somewhat diagrammatically in Figures 7 and 8. The upper end 25 of the shaft 17 is adapted to receive a sound record support body 26 to the bottom of which is fastened a ratchet wheel 27 for a purpose hereinafter referred to. The support body 26 may be fastened to the shaft end 25 in any suitable manner.

Figure 5:
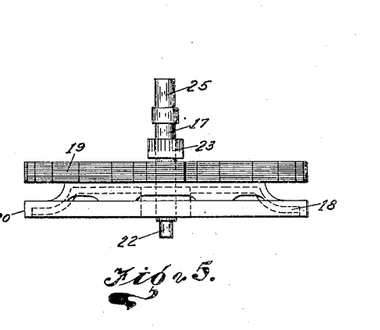
Figure 5 is an elevation of the operating shaft with the rotating element carried thereon except the bearing therefor and the sound record support.
Figure 6:
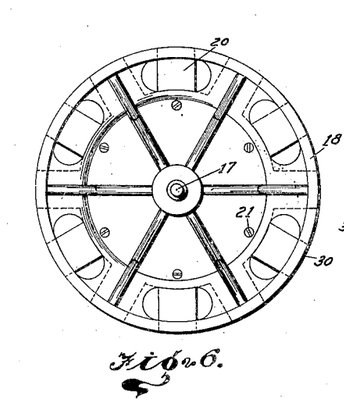
Figure 6 is a top plan view of Figure 5.
Figures 15, 16, 17, 18:
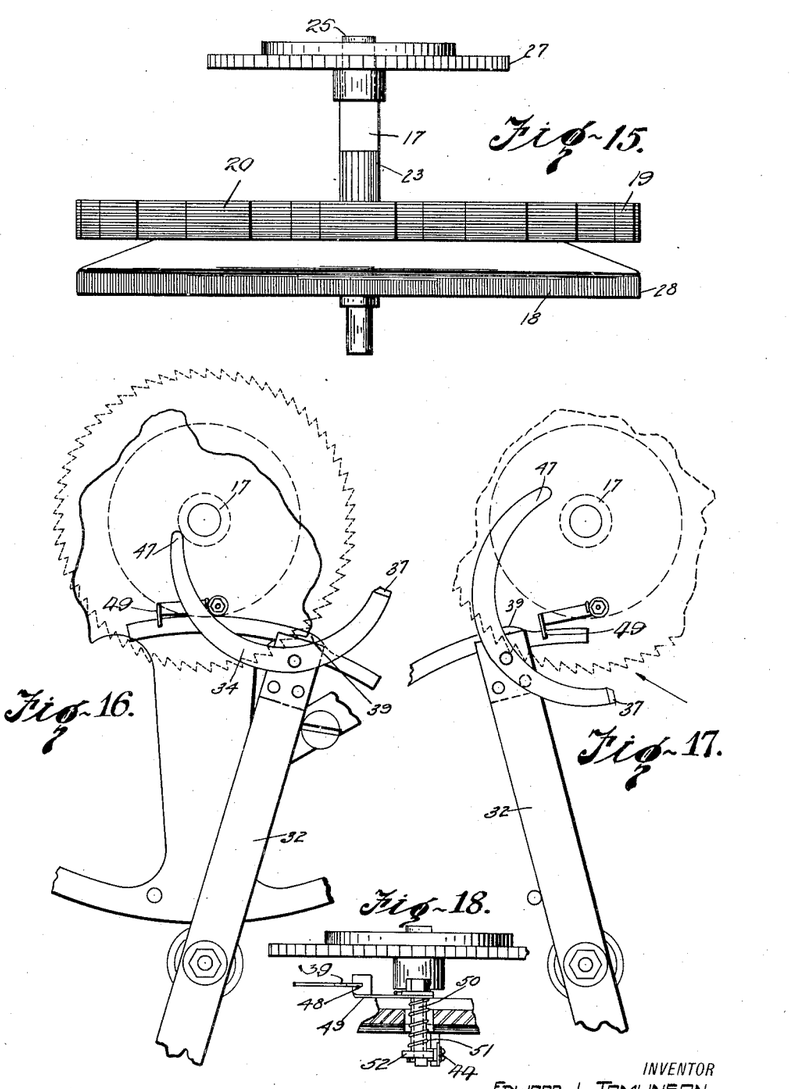
Figure 15 shows a construction corresponding to that illustrated in Figure 5 but with certain of the details changed.
Figure 16 shows a modified form of starting mechanism in non-running position.
Figure 17 is a view similar to Figure 16 but with the starting mechanism in running position.
Figure 18 is an enlarged view of a part of the starting mechanism looking in the direction of the arrow of Figure 17.

In Figure 15, I have shown an alternative construction to that shown in Figures 5 and 6. In this alternative form the member 18 is preferably a punching and has the edge knurled to receive a governor driving wheel 29 shown in Figure 3. In Figures 5 and 6, the wheel 29 runs against the edge 30 of the circular member 18. As will be seen in Figure 15, the cam 23 is cut directly on the shaft 17 and the ratchet wheel 27 is also carried on the shaft instead of being attached to the sound record support 26. A part of the casing is cut out at 65 to allow the governor weights to clear the casing although if desired the casing, of course, may be cast with a pocket therein so that the governor parts are completely enclosed. Mounted within the casing 2 is a governor mechanism 31 which is shown and described in my application, Serial No. 288,385, filed April 7, 1919, and since this governor mechanism forms no part of my present invention it will not be referred to in detail herein.

It will be understood from what has been said that I have provided a phonograph motor which is enclosed within a suitable casing forming a unitary structure that can be handled with considerable roughness without injuring the various parts of the motor.

Figure 1:
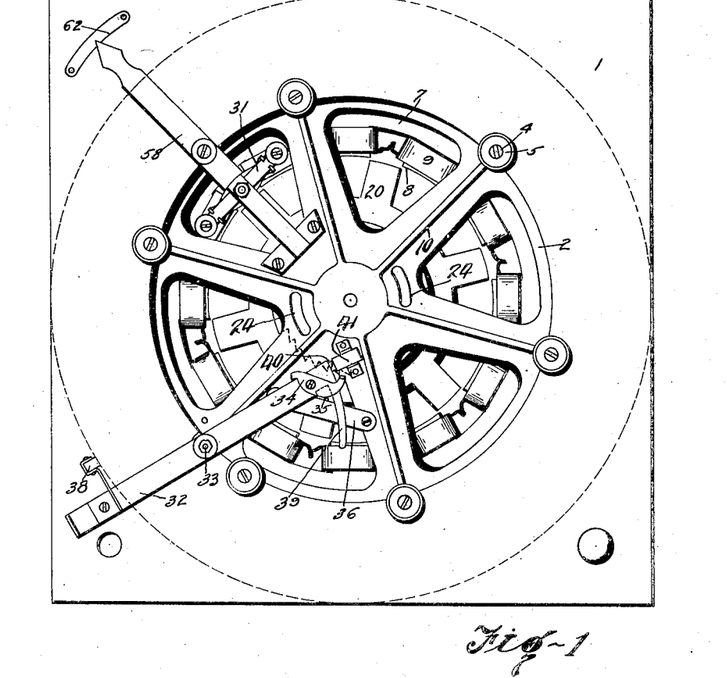
Figure 1 is a top view of the phonograph with the sound record support removed.
Figure 2:
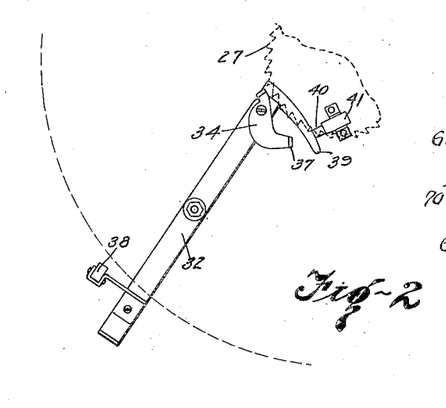
Figure 2 is a view of part of the mechanism shown in Figure 1 but in running position.

In order to assist the sound record support in coming quickly up to speed, I have provided a lever 32 which is pivotally mounted at 33. On one end of the lever 32 is pivotally mounted a pawl 34 which when the lever 32 is in the position shown in Figure 1, engages the stop 35 fastened to the bracket 36 which places the pawl 34 in a position so that a finger 37 on the end thereof is adapted to engage the teeth of the ratchet wheel 27. I have shown in Figure 1, in dotted lines, the position which the teeth of the ratchet wheel would have provided the support 26 were in position on the end of the shaft 17 as described. The opposite end of the lever 32 from the pawl 34 carries a friction brake 38 which in the non-running position engages the edge of the record support to stop it from rotation. The end of the lever 32 fastened to the pawl 34 carries a cam member 39. The cam 39 acts on a plunger 40 carried in a receptacle 41 within which is a spring 42 (see Figures 7 and 8). The plunger 40 carries an arm 43 which extends downward so as to engage the movable member 44 of the circuit breaker when the lever 32 is in the non-stop position, as shown in Figures 1 and 7, wherein it is seen that the contacts 45 and 46 are held open and the circuit through the electromagnetic motor is opened and the motor stopped. On moving the lever 32 to the position shown in Figure 2 the brake 38 is removed, an impulse given to the support body 26 as previously described, and the cam member 39 is moved so that the plunger 40 is moved outward from the receptacle 41 by the spring 42 and the arm 43 is withdrawn from engagement with the circuit breaker member 44 allowing the contacts 45 and 46 to come into their normal engagement position whereby they may be operated by the cam 23 on the rotating shaft for the purpose of producing timed impulses through the windings 9.

Figure 19:
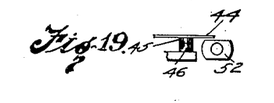
Figure 19 shows a detail of part of the mechanism illustrated in Figure 18 but with these parts in running position.
Figure 20:
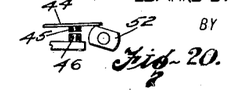
Figure 20 is a view similar to Figure 19 but with the parts in non-running position.
Figure 21:
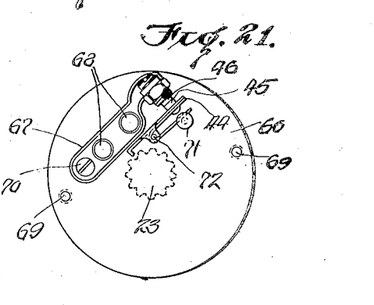
Figure 21 is a bottom view of my circuit breaker, the operating cam being shown in dotted lines.

I have shown in Figures 16 to 20 inclusive, an alternative form of an impulse starting device and circuit breaker opening mechanism so that it will be readily perceived that many changes may be made in the details relating to my invention. In Figure 16 the lever 32 carries a circular pawl 34 which is positioned so that the finger 37 will engage the ratchet teeth by the end 47 coming into engagement with the shaft 17 as the end of the lever, shown in Figure 17, is moved to the right. The cam member 39 shown in Figures 16 and 17 is constructed somewhat differently from that shown in Figures 1 and 2, in that the edge of it runs in a slot 48 that is cut in a member 49 (see Figure 18). The member 49, is fastened to a rotatable spindle 50 which is caused to keep the member 49 in sliding engagement with the member 39 by spring 51. On the end of the spindle 50 is an engaging piece 52 preferably of fiber and as the members 49 and 50 are operated by the cam 39 the member 52 operates the circuit breaker 44 to open the contacts 45 and 46 and to hold them open as shown in Figure 20 or to allow them to close for normal functioning as shown in Figure 19.

The interior wiring of my phonograph motor is all brought out to terminals 53 and 54 to which may be attached any suitable source of power either alternating or direct current, it being understood that the windings 9 are arranged to meet the necessary condition of voltage, etc. I have shown in Figures 7 and 8 the windings 9 merely diagrammatically and the circuit through the motor may be traced from the binding post 53 through the windings 9, circuit breaker contacts 46 and 45 to ground G thence through the governor 31 and back to binding post 54. Around the governor contacts, I prefer to use a non-inductive resistance 55 and across the breaker contacts a non-inductive resistance 56 and in series therewith a condenser 57. In some cases the condenser may be used alone or the non-inductive resistance used alone but I prefer to use a suitable combination of both as shown.

The speed regulation of my motor is taken care of by a governor 31 which is more fully described in my co-pending application above referred to but the adjustment herein shown is somewhat different from that described in my co-pending application above referred to in that the lever 58 has a cam end 59 adapted to cooperate with a cam surface 60 carried on the member 61 which in turn carries a stationary contact. The cam surface 60 is preferably of fiber. When these cam surfaces are in the position shown in Figure 10 a certain speed of the motor is attained. With the cam surfaces shown in the position in Figure 11 a different speed is obtained since the stationary contact is carried inward farther. An indicating plate 62 on the frame 1 is preferably used and has thereon suitable markings to indicate the speed of rotation of the sound record support.

Figure 12:
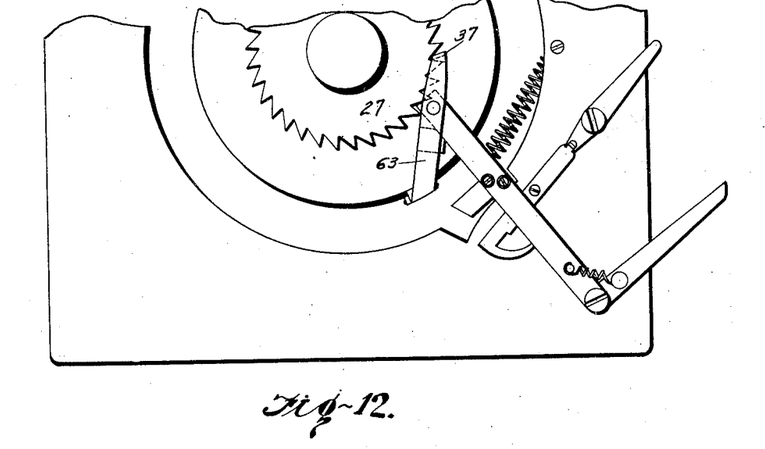
Figure 12 shows a modified form of starting device.
Figure 13:
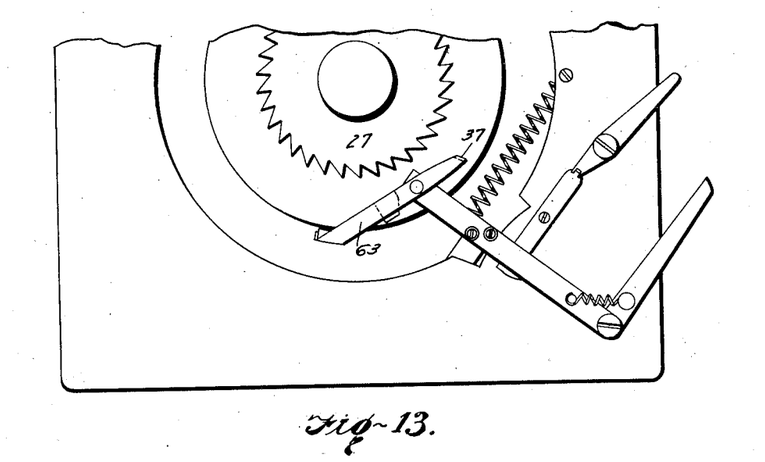
Figure 13 is a view similar to Figure 12 but with the starting devices in different position of operation.
Figure 14:
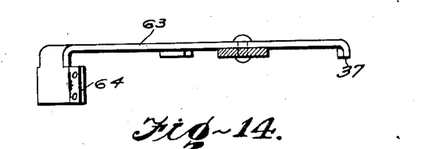
Figure 14 is an enlarged view of one of the elements shown in Figures 12 and 13.

In my co-pending application Serial No. 288,386, above referred to, I have shown and described an automatic starting and stopping mechanism of a given type. In Figures 12, 13 and 14 herein, I have shown the same mechanism used in connection with the ratchet wheel hereinbefore described and a member 63 having a finger 37 for engaging the teeth of ratchet wheel 27. The member 63 carries a brake member 64 of felt, leather or other suitable material so that the lever 63 performs a double function of producing a starting impulse and braking the sound record support.

It will be readily understood that in a device of this kind numerous changes or alterations may be made in the various parts and I therefore do not wish to be limited to any specific construction except as set forth in the appended claims.

Having thus described my invention, what I claim is:—

1. In a phonograph, in combination, a cup-shaped casing having an inner annular flange and a central hole in the bottom of the casing, a magnetic field structure securely carried in said casing on said flange and having a plurality of pole pieces with exciting windings thereon, a cover plate for said casing, a support structure including an operating shaft for a sound record body rotatably carried wholly by said cover plate and having a part guided by said central hole, said shaft carrying inductors in operative relationship to said field pole pieces.

2. In a phonograph, in combination, a casing, a magnetic field structure carried within said casing and having a plurality of pole pieces with exciting windings thereon, a cover plate for said casing, a support structure including an operating shaft for a sound record body rotatably carried wholly by said cover plate, said shaft carrying within the casing inductors in operative relationship to said field pole pieces.

3. In a phonograph, in combination, a casing, a magnetic field structure carried within said casing and having a plurality of pole pieces with exciting windings thereon, a plate for the top of said casing, a support structure including an operating shaft for a sound record body rotatably carried wholly by said plate, said shaft carrying within the casing magnetically connected inductors equal in number to said field pole pieces and in operative relationship with the same.

4. In a phonograph, in combination, a casing, a magnetic field structure carried by and within said casing and having a plurality of radially extending pole pieces with exciting windings thereon, a plate for the top of said casing, a movable support structure including an operating shaft for a sound record body carried wholly by said plate, said shaft carrying within the casing magnetically connected inductors equal in number to said field pole pieces and extending radially into operative relationship with said pole pieces.

5. In a phonograph, in combination, a magnetic field structure and a support therefor, said field structure having a plurality of radially extending pole pieces, a movable support structure including an operating shaft for a sound record body and a bearing for said shaft, said first mentioned support carrying an annular flange and a structure of magnetic material having pole pieces extending into operative relationship therewith, means for exciting all of said field pole pieces simultaneously including speed responsive devices cooperating with the flange; and means on said movable support for controlling the time of action of said excitation.

6. In a phonograph, in combination, a casing, a cover for said casing, a magnetic field structure supported by said casing, a bearing on the upper surface of said cover, a support structure including an operating shaft rotatably mounted on said cover, said support structure including a bearing cooperating with the cover carried bearing, an inductor element cooperating with the field structure within the casing, and a guide in the casing for the lower portion of said support structure.

7. In a phonograph, a single unitary operating structure including a casing, a magnetic member having a plurality of pole pieces mounted within the casing, a cover for the casing, a movable support structure including an operating shaft for a sound record body carried on the cover, a magnetic member carried on said shaft and within the casing and having a plurality of pole pieces equal in number to those first mentioned, means for simultaneously exciting all of said pole pieces to rotate said movable support and shaft and means mounted on the support structure for controlling the speed of rotation of said movable support.

8. In a phonograph, in combination, a cup-shaped casing having a central hole in the bottom thereof, a magnetic field structure secured within the casing and having a plurality of pole pieces with exciting windings thereon, a cover plate for said casing, a bearing member carrying anti-friction members on the upper part of said cover plate, a shaft having one end positioned within said central hole and the other end extending through said cover plate and having a bearing member to cooperate with the first mentioned bearing member, a support for a sound record body fastened to the end of said shaft adjacent said last mentioned bearing member, a circular member on said shaft within the housing, a magnetic structure carried by said circular member and having inductor pole pieces equal in number to said field pole pieces, a cam carried on said shaft adjacent said inductor member, a timer operated by and carried on the interior of said cover plate for closing an electrical circuit through said exciting windings at intervals corresponding to the number of said inductor pole pieces and means for controlling the speed of rotation of the movable support.

9. In a phonograph, the combination of a rotatable sound record body support and electromagnetic motor means therefor, of a circuit breaker for said motor means operated intermittently upon rotation of the support and a lever operable to engage the movable member of the circuit breaker to open the circuit upon movement of the lever to non-playing position.

10. In a phonograph, the combination of, a rotatable sound record body support; electromagnetic motor means for carrying and driving said support, said motor means consisting of; a stationary magnetic field structure supported within a casing and a rotating part including a shaft carrying inductors in operative relationship to said stationary field structure, a top cover plate closing in the casing and supporting said shaft and inductors; a device enclosed within the casing for controlling the angular position of said shaft and support for energizing said motor means intermittently as the shaft and support rotate, a ratchet wheel rotatable with said shaft and support, a lever carrying a pawl at one end within the casing and a brake member at the other end, a part of the lever extending without the casing, said brake member engaging said rotatable support when the lever is in non-running position, said pawl having a passing engagement with said ratchet wheel to give said support a starting impulse when the lever is moved to running position as described.

12. In a phonograph the combination of, a rotatable sound record body support, electromagnetic motor means having a shaft for carrying and driving said support, a pivoted circuit breaker controlled in its movement by the angular position of said shaft and support for energizing said motor means intermittently as the shaft and support rotate, a lever having a non-running and a running position and means operated by said lever in its non-running position for acting on the pivoted element of said circuit breaker to hold the breaker in open circuit position and for allowing said breaker to function to intermittently energize said motor means when said lever is in running position, as and for the purpose described.

12. In a phonograph the combination of, a rotatable sound record body support, electromagnetic motor means having a shaft for carrying and driving said support, a ratchet wheel rotatable with said shaft and support, a circuit breaker controlled by the angular position of said shaft and support for energizing said motor means intermittently as the shaft and support rotate, a lever having a brake member at one end and a pawl and cam member at the other end, said lever having a non-running and a running position, said brake member being applied to said support to hold it stationary and means operated by said cam member to hold open the circuit breaker when the lever is in non-running position, said brake member being removed from engagement with said support and said pawl moved so as to have passing engagement with said ratchet wheel and the cam member moved whereby said means acting on the circuit breaker moves to allow the breaker to function when the lever is moved to running position.

13. In a phonograph the combination of, a rotatable sound record body support, electromagnetic motor means having a shaft for carrying and driving said support, a circuit breaker controlled by the angular position of said shaft and support for energizing said motor means intermittently as the shaft and support rotate, means when moved to one position for applying a brake to said support and at the same time disabling the circuit breaker and when moved to another position for removing said brake and giving an impulse to said support and putting the circuit breaker in position to function as described.

14. In a phonograph, in combination, a casing, an electromagnetic motor mounted within said casing and having a shaft extending through the casing and journalled on one side thereof, a circuit breaker carried on the interior of said casing for periodically energizing said motor, a cam on said shaft for operating said breaker, a sound record support carried on said shaft exterior to said casing, means mounted on said casing for acting on an element of said circuit breaker to hold the same open or in operative position at will, and means serving to give said support a starting impulse.

15. In a phonograph, in combination, a casing, an electromagnetic motor mounted within said casing, said motor having a stationary field structure fastened to the casing with a plurality of wound field pole pieces projecting radially inward and a shaft carrying a circular member and a rotary inductor fastened to said member with pole pieces equal in number to said field pole pieces and extending radially outward in proximity to said field pole pieces; a circuit breaker for periodically closing a circuit through said wound fields carried on and within the casing, a cam on said shaft for operating said breaker, a sound record support body on said shaft exterior to the casing, starting engagement means operatively carried by said shaft, a lever having means for engaging said engagement means to give said shaft and record support a starting impulse, means operated by said lever to hold the circuit breaker open when desired and further means for braking the record support at the time the circuit breaker is held in open position and a governor mounted within the casing and operated from said circular member for regulating the speed of the sound record support.

In witness whereof, I affix my signature.

EDWARD J. TOMLINSON.